United States Patent [19]
Foltz

[11] Patent Number: 5,599,265
[45] Date of Patent: Feb. 4, 1997

[54] BARBED RING FLANGE ASSEMBLY

[75] Inventor: Robert S. Foltz, Rochester, N.Y.

[73] Assignee: Xerox Corporation, Stamford, Conn.

[21] Appl. No.: 359,253

[22] Filed: Dec. 19, 1994

[51] Int. Cl.[6] .................................................. G03G 15/00
[52] U.S. Cl. ............................................. 492/47; 399/159
[58] Field of Search ............................. 492/47; 355/200, 355/210, 211

[56] References Cited

U.S. PATENT DOCUMENTS

| | | | |
|---|---|---|---|
| 4,196,496 | 4/1980 | Stauffer et al. | 492/47 |
| 4,290,255 | 9/1981 | Martenas | 492/47 |
| 4,561,763 | 12/1985 | Basch | 355/3 DR |
| 5,357,321 | 10/1994 | Stenzel et al. | 355/211 |
| 5,461,464 | 10/1995 | Swain | 355/211 |

*Primary Examiner*—Larry I. Schwartz
*Assistant Examiner*—Marc W. Butler

[57] ABSTRACT

A hollow cylinder supporting end flange is disclosed comprising a disk shaped member, a supporting hub extending axially from the disk shaped member and an annular ring supported on the hub, the ring comprising a plurality of sharp protrusions or barbs extending from the ring in a direction away from the hub for engagement with the hollow cylindrical member upon insertion of the annular ring into the hollow cylindrical member. This end flange is utilized in an assembly comprising a hollow cylindrical member having a circular cross section and an inner surface and an end flange comprising a disk shaped member having a circular periphery, a supporting hub extending axially from the disk shaped member into one end of the hollow cylindrical member and an annular ring supported on and secured to the hub, the ring comprising a plurality of sharp protrusions extending from the ring in a direction away from the hub into engagement with inner surface of the hollow cylindrical member to secure the hollow cylindrical member to the end flange.

21 Claims, 4 Drawing Sheets

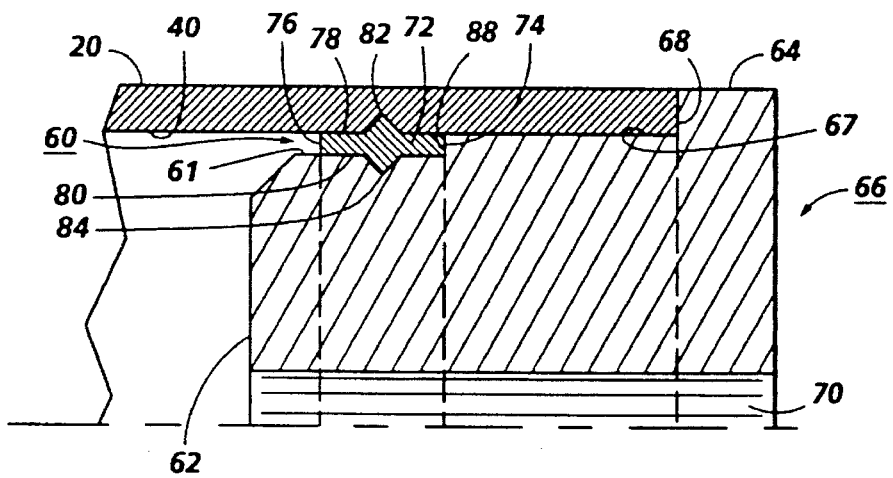
FIG. 5
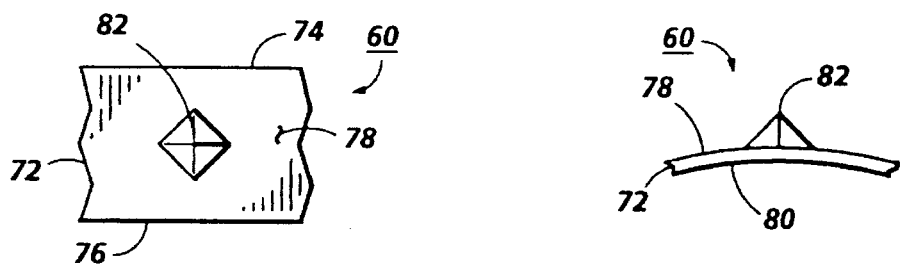
FIG. 6     FIG. 7
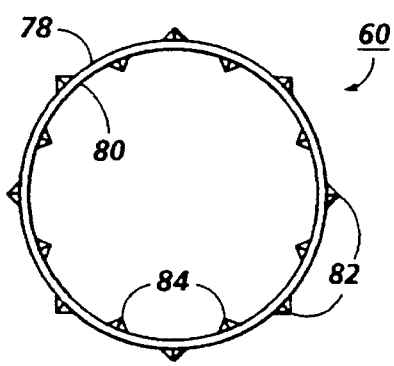
FIG. 8
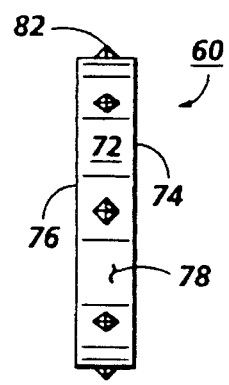
FIG. 9

BARBED RING FLANGE ASSEMBLY

BACKGROUND OF THE INVENTION

This invention relates in general to hollow cylindrical member support apparatus and more specifically to a hollow cylindrical member supporting end flange comprising a barbed ring, a hollow cylindrical member assembly containing the end flange and methods for fabricating and using the hollow cylindrical member assembly.

A photoreceptor conventionally utilized for copiers and printers comprises a hollow electrically conductive drum substrate which has been dip coated with various coatings including at least one photoconductive coating comprising pigment particles dispersed in a film-forming binder. These drum type photoreceptors are usually supported on an electrically conductive shaft by drum supporting hubs or end flanges. The hubs are usually constructed of plastic material and have a hole through their center into which a supporting axle shaft is inserted. Since hubs are usually constructed of electrically insulating plastic material, an electrical grounding means comprising a flexible spring steel metal strip is secured to the hub and positioned to contact both the electrically conductive axle shaft and the electrically conductive metal substrate of the photoreceptor drum. One type of grounding means is illustrated in U.S. Pat. No. 4,561,763. Although excellent support is provided by these hubs, slippage between the hub and the drum substrate can occur under high torque conditions where considerable friction can be imposed on the surface of the photoreceptor by contact with subsystems such as cleaning blades and the like or where the flange on the opposite end of the photoreceptor drum is utilized to drive other copier or printer components.

Often the hub or end flange is secured to the end of the drum by a thermosetting resin adhesive. The use of an adhesive increases the number of steps and complexity of equipment required to assemble and disassemble a hub and cylindrical member assembly. Recycling of used drums having glued hubs is difficult, if not impossible, because of damage to the hub or the drum or both during removal of the hub from the drum by common techniques such as by hammering. Such removal techniques damage or destroy both the drum and the hub. Further, where disassembly is accomplished without damage, cleaning of both the hub and the cylindrical substrate is required to remove adhering adhesive. In addition, adhesive application equipment utilized during mounting of an end flange to a cylindrical substrate are difficult to maintain because the adhesive has a short pot life and often solidifies and clogs the equipment thereby requiring time consuming efforts to clean and remove the solidified adhesive. The use of bolts and nuts to secure hubs to drums requires time intensive activity.

Another type of hub avoids the need for an adhesive by utilizing resilient fingers having pointed tips that dig into and penetrate the inner surface of the drum. This hub is described in U.S. Pat. No. 5,357,321, the entire disclosure thereof being incorporated herein by reference. The hub provides excellent support for the drum. However, the pointed tips provide a limited number of gripping points to secure the hub to the periphery of a hollow drum for high torque situations. Moreover the amount of compressive pressure that can be exerted between the pointed tips and the drum is limited by the flexibility of the resilient fingers.

Thus, there is a continuing need for improved photoreceptors that are simpler to mount and remove and which can endure high torque applications.

INFORMATION DISCLOSURE STATEMENT

U.S. Pat. No. 5,357,321 issued to Stenzel et al on Oct. 18, 1994—A drum supporting hub is disclosed comprising a disk shaped member having a circular periphery, a hole extending axially through the center of the disk shaped member, and at least one long thin electrically conductive resilient member secured to the disk shaped member, the resilient member having a central section adjacent the hole and having opposite ends, each of the ends terminating into at least one pointed tip adjacent the circular periphery of the disk shaped member, and the resilient member having a major plane substantially parallel to the axis of the disk shaped member. This hub may be inserted in at least one end of a cylindrical electrostatographic imaging member to produce an imaging member assembly.

U.S. Pat. No. 4,561,763 issued to D. Basch issued on Dec. 31, 1985 a drum supporting hub is disclosed having a tapered pot-like hub configuration comprising a bottom section and a rim, the rim comprising a plurality of circumferentially spaced resilient fingers extending at a slight incline outwardly from the axis of the pot-like hub away from the bottom section, at least three of the fingers having lips at the ends of the fingers, the lips projecting away from the axis for engagement with an end of a cylindrical drum upon insertion of the pot-like hub into the drum, the rim other than the lips having an outside diameter slightly larger than the outside diameter of the bottom. The drum supporting hub is employed in a drum assembly comprising the hub, a cylindrical drum having a circular cross-section and a shaft positioned along the axis of the drum. A metal shim is utilized to electrically ground the drum to the shaft.

SUMMARY OF THE INVENTION

It is, therefore, an object of the present invention to provide an improved end flange and hollow cylindrical member assembly which overcomes the above-noted disadvantages.

It is another object of this invention to provide an improved end flange and hollow cylindrical member assembly which facilitate recycling of end flanges and hollow cylindrical members.

It is yet another object of this invention to provide an improved end flange and hollow cylindrical member assembly which reduces the number of assembly steps utilized to manufacture the assembly.

It is still another object of this invention to provide an improved end flange and hollow cylindrical member assembly which eliminates the need for gluing an end flange to the end of a hollow cylindrical member.

It is another object of this invention to provide an improved end flange and hollow cylindrical member assembly which quickly achieves excellent anchoring of the end flange to a hollow cylindrical member.

The foregoing and other objects of the present invention are accomplished by providing a hollow cylinder supporting end flange comprising a disk shaped member, a supporting hub extending axially from the disk shaped member and an annular ring supported on the hub, the ring comprising a plurality of sharp protrusions or barbs extending from the ring in a direction away from the hub for engagement with the hollow cylindrical member upon insertion of the annular ring into the hollow cylindrical member. This end flange is utilized in an assembly comprising a hollow cylindrical member having a circular cross section and an inner surface and an end flange comprising a disk shaped member having a circular periphery, a supporting hub extending axially from the disk shaped member into one end of the hollow cylindrical member and an annular ring supported on and secured to the hub, the ring comprising a plurality of sharp protrusions extending from the ring in a direction away from the hub into engagement with inner surface of the hollow cylindrical member to secure the hollow cylindrical member to the end flange.

BRIEF DESCRIPTION OF THE DRAWINGS

In general, the advantages of the improved drum supporting hub and drum assembly will become apparent upon consideration of the following disclosure of the invention, particularly when taken in conjunction with the accompanying drawings wherein:

FIG. 5 is a schematic cross sectional side view of another end flange and barbed annular ring embodiment of this invention mounted in one end of a hollow cylinder.

FIG. 6 is a schematic sectional plan view of a sharp protrusion extending from a segment of a barbed annular ring of this invention.

FIG. 7 is a schematic sectional side view of the sharp protrusion and barbed annular ring segment illustrated in FIG. 6.

FIG. 8 is a schematic end view of sharp protrusions of this invention extending toward and away from the axis of a barbed annular ring.

FIG. 9 is a schematic side view of the embodiment shown in FIG. 8.

These figures merely schematically illustrate the invention and are not intended to indicate relative size and dimensions of actual devices and components thereof.

DETAILED DESCRIPTION OF THE DRAWINGS

The present invention may be employed in any suitable device that requires support for a drum. However, for purposes of illustration, the invention will be described with reference to an electrostatographic imaging system. A typical electrophotographic imaging system is illustrated in U.S. Pat. No. 3,900,258 to R. F. Hoppner et al, the entire disclosure thereof being incorporated herein by reference.

Figure 1:
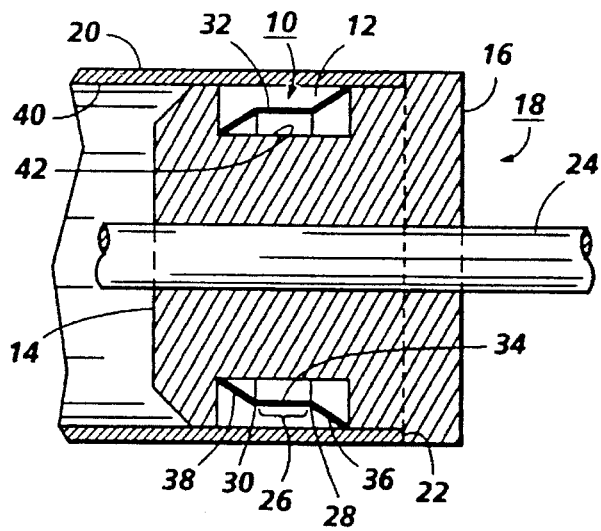
FIG. 1 is a schematic cross sectional side view of an end flange of a barbed annular ring of this invention mounted in a hollow cylinder.
Figure 2:
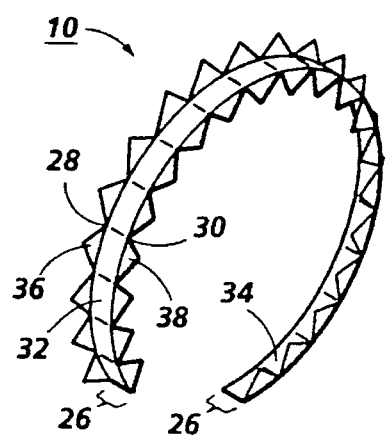
FIG. 2 is a schematic isometric view of a barbed annular ring embodiment of this invention.

Referring to FIGS. 1 and 2, a resilient barbed annular ring 10 is illustrated supported in an annular channel 12 of a support hub 14 carried by a disk shaped member 16 of end flange 18 support hub 14 has an imaginary axis. End Flange 18 supports a cylindrical imaging member 20. Shoulder 22 of end flange 16 abuts one end of cylindrical imaging member 20 to ensure alignment of flange 18 to the end of cylindrical imaging member 20. A support shaft 24 extends along the axis of cylindrical imaging member 20 and through a hole in the center of flange 16. Any suitable support shaft 24 may be utilized to support end flange 18. Shaft 24 may comprise any suitable material including, for example, metals such as steel, stainless steel, aluminum, brass, and the like; polymers such as polyesters, polycarbonates, polyethylene, polypropylene, polystyrene, polyvinylchloride, ABS, polyamides, acrylics, acetals, cellulosics, phenolics and the like; of reinforced polymers such as glass fiber and graphite fiber reinforced plastics, and the like. End flange 18 may be secured to shaft 24 by any suitable and conventional means (not shown) such as a set screw, key and slot combination, adhesive, press fit, welding, crimping, screwing and the like. Alternatively, end flange 18 may be driven directly by hexagonal or square support shafts (not shown) which mate with correspondingly shaped openings (not shown)in end flange 18. The support shaft can be driven directly by an electric motor (not shown) or by any other suitable power source as is well known in the art. Alternatively, end flange 18 may freely rotate on the support shaft. End flange 18 preferably has a circular periphery and a centered hole. However, instead of a support shaft which extends through the entire length of the hollow cylindrical member the end flange may have a molded support shaft stub (not shown) which extends away from the hollow cylindrical member. This latter embodiment preferably utilizes an electrically conductive end flange. Barbed annular ring 10 comprises a central curvilinear band 26 having a substantially rectangular cross section, a first edge 28, a second edge 30, an outwardly facing surface 32 and an inwardly facing surface 34. A plurality of sharp protrusions or teeth 36 extend from first edge 28 of ring 10 in a direction away from hub 14 and toward the imaginary axis of the inner surface 40 of cylindrical imaging member 20. A plurality of sharp protrusions or teeth 38 extend from second edge 30 of ring 10 in a direction toward hub 14 and away the the imaginary axis of inner surface of cylindrical imaging member 20. Sharp protrusions 36 engage the inner surface 40 of cylindrical imaging member 20 and sharp protrusions or teeth 38 engage the outer surface 42 of hub 14 because the dimensions of annular ring 10 prior to positioning between hub 14 and inner surface 40 of cylindrical imaging member 20 are preselected so that sharp protrusions or teeth 36 extend out of channel 12 even when sharp protrusions or teeth 38 are in contact with the outer surface 42 of hub 14. Thus, compressive pressure is applied to squeeze at least the sharp protrusions or teeth 36 of annular ring 10 toward channel 12 to ensure that sharp protrusions 36 and sharp protrusions 38 fully engage inner surface 40 of cylindrical imaging member 20 and outer surface of hub 40, respectively, when hub 14 carrying ring 10 in channel 12 is inserted into the interior of cylindrical imaging member 20. Preferably, most of annular ring 10 fits in channel 12 during mounting of end flange 18 into the end of cylindrical imaging member 20. This helps prevent dislodging of ring 10 from channel 12 during mounting. Annular ring 10 should not be so large in size that it blocks insertion of end flange 18 into the end of cylindrical imaging member 20 or so small that sharp protrusions 36 and sharp protrusions 38 fail to engage inner surface 40 of cylindrical imaging member 20 and outer surface of hub 14, respectively, when hub 14 carrying ring 10 in channel 12 is inserted into the interior of cylindrical imaging member 20. Thus, annular ring 10 comprises a central curvilinear band 26 having sharp protrusions or teeth 36 extending from first edge 28 inclined toward disk shaped member 16 and engaging inner surface 40 of cylindrical imaging member 20 and also having sharp protrusions or teeth 38 extending from second edge 30 inclined away from disk shaped member 16 and engaging the outer surface of hub 40.

Although annular ring 10 may comprise a continuous ring, it may, alternatively, be a split ring as shown in FIG. 2. A split ring is preferred for ease of installation on hub 14 where channel 12 (see FIG. 1) is a permanent channel. More specifically, the ends of a split ring version of resilient annular ring 10 may temporarily be spread apart to increase the inside diameter of spring 10 during mounting of ring 10 onto hub 14 so that ring 10 can be snapped into channel 12. Although the end of hub 14 is illustrated in FIG. 1 as a unitary member, it may, alternatively, comprise a multi-piece member which can be disassembled to facilitate mounting of ring 10. For example, the end of hub 14 which forms one wall of channel 12 may comprise a nut (not shown) threaded onto hub 14 or the end of hub 14 may be the head of a screw (not shown) threaded into the end of hub 14. Satisfactory results may be achieved when spit ring 10 forms arc at least between about 200 degrees and about 360 degrees. Preferably, the arc is between about 270 degrees and about 360 degrees to ensure secure mounting of hub 14 to the end of cylindrical imaging member 20 and to distribute sharp protrusions or teeth 36 over a greater arc thereby minimizing any distortion of cylindrical imaging member 20, if imaging member is fabricated from relatively thin distortable material.

Figure 3:
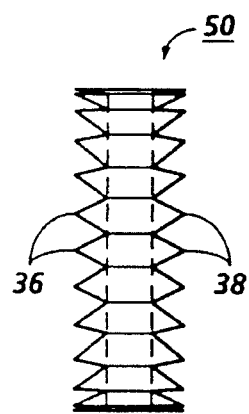
FIG. 3 is a schematic side view of a barbed annular ring prior to bending of each sharp protrusion on each side of a central curvilinear band.

Referring to FIG. 3, a partially fabricated ring 50 is shown. This ring 50 may be formed, for example, by stamping out a pattern from sheet metal and thereafter bending the stamped member into a circular shape. The teeth sharp protrusions or teeth 36 and 38 may be bent in the directions shown in FIG. 2 prior to or subsequent to bending the stamped member into a circular shape. If desired, the final shaped ring may be tempered by any suitable and conventional tempering process.

Figure 4:
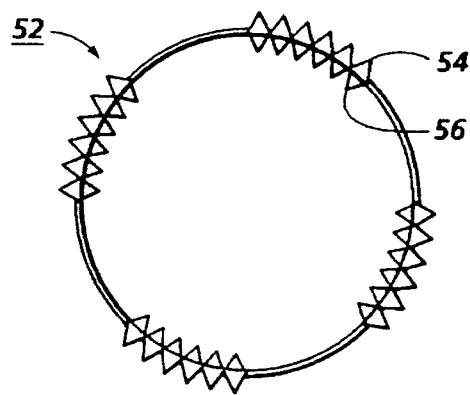
FIG. 4 is a schematic end view of another annular ring embodiment of this invention in which clusters of sharp protrusions are spaced from each other around the periphery of the barbed annular ring.

Illustrated in FIG. 4 is another embodiment of an annular ring 52 comprising clusters of protrusions or teeth 54 and 56 substantially uniformly spaced around the edges of ring 52. Protrusions or teeth 54 point away from the axis of ring 52 and protrusions or teeth 56 point toward the axis of ring 52. Generally, substantially uniform spacing of the clusters around ring 52 is preferred to minimize distortion of the hollow cylindrical imaging member and to ensure that the hollow cylindrical imaging member is concentric with the support hub and support shaft.

Shown in FIG. 5 is a barbed annular ring 60 supported on the outer surface 61 of an annular support hub 62 carried by a disk shaped member 64 of end flange 66. End Flange 66 supports a cylindrical imaging member 20 on rim 67. Rim 67 may be molded together with disk shaped member 64. If desired, rim 67 and end flange 66 can be preformed (not shown) and thereafter fastened to disk shaped member 64 by any suitable means such as by an adhesive, screw or the like. Rim 67 ensures that end flange 66 is centered in the end of hollow cylindrical member 20. A slight press or resistance fit of rim 67 of flange 66 into the end of hollow cylindrical member 20 may be desirable to to ensure that end flange 66 is coaxial with cylindrical member 20. If desired, the side of rim 67 facing the interior surface of hollow cylindrical member 20 may be tapered, beveled or otherwise or inclined toward the drum centerline (not shown) to facilitate insertion of end flange 66 into one end of cylindrical member 20 and to promote a snug fit between end flange 66 and cylindrical member 20. Thus, for example, rim 67 may have a truncated cross section. Rim 67 may be a continuous rim or a plurality of rim segments. Alternatively, instead of using rim 67, a conventional recess (not shown) may be formed in disk shaped member 64 to accept the end of cylindrical member 20. Shoulder 68 of end flange 66 abuts one end of cylindrical imaging member 20 to ensure alignment of flange 66 to the end of cylindrical imaging member 20. A hole 70 is partially shown along the axis of flange 66 for receiving a support shaft (not shown). Barbed annular ring 60 comprises a curvilinear band 72 having a substantially rectangular cross section, a first edge 74, a second edge 76, an outwardly facing surface 78 and an inwardly facing surface 80. A plurality of sharp protrusions or teeth 82 extend from outwardly facing surface 78 toward the inner surface 40 of cylindrical imaging member 20. A plurality of sharp protrusions or teeth 84 extend from inwardly facing surface 80 toward the outer surface 61 of hub 62. Sharp protrusions 82 partially penetrate the inner surface 40 of cylindrical imaging member 20 and sharp protrusions or teeth 84 partially penetrate the outer surface 61 of hub 62 because the dimensions of annular ring 60 prior to positioning between hub 62 and inner surface 40 of cylindrical imaging member 20 are preselected so that the tips of sharp protrusions or teeth 82 extend out above the radial height of shoulder 88 even when sharp protrusions or teeth 84 are in contact with the outer surface 61 of hub 62. Thus, during insertion of end flange 66 into cylinder 20, compressive pressure is applied by inner surface 40 to at least the sharp protrusions or teeth 82 of annular ring 60 at least partially in a direction toward outer surface 61 of hub 62 to ensure that sharp protrusions 82 and sharp protrusions 84 engage and, if desired, partially penetrate inner surface 40 of cylindrical imaging member 20 and outer surface 61 of hub 62, respectively, when hub 62 carrying ring 60 abutting shoulder 68 is inserted into the interior of cylindrical imaging member 20. Preferably, first edge 74 of annular ring 10 abuts shoulder 68 during mounting of end flange 66 into the end of cylindrical imaging member 20. Shoulder 68 helps maintain ring 60 in a predetermined location on hub 62 and also maintains the major planes of ring 60 and disk shaped member 64 parallel to each other during and after mounting. The expression "major plane", as employed herein, is defined as a plane which extends through either the annular ring or disk shaped member and which is perpendicular to the axis of either the ring or disk shaped member. Annular ring 60 should not be so large in size that it blocks insertion of end flange 66 into the end of cylindrical imaging member 20 or so small that sharp protrusions 82 and sharp protrusions 84 fail to engage inner surface 40 of cylindrical imaging member 20 and outer surface of hub 61, respectively, when hub 62 carrying ring 60 is inserted into the interior of cylindrical imaging member 20.

Additional views of the barbed annular ring 60 of FIG. 5 are shown in FIGS. 6 through 9. As indicated above, barbed annular ring 60 comprises a curvilinear band 72 having a generally rectangular cross section, a first edge 74, a second edge 76, an outwardly facing surface 78 and an inwardly facing surface 80, curvilinear band 72 having a first edge 74, a second edge 76, an outwardly facing surface 78, and sharp protrusions or teeth 82 and 84. Sharp protrusions or teeth 82 and 84 may be formed by any suitable means such as a tool having a pyramid shaped point which is impacted against one side of curvilinear band 72, the opposite side of curvilinear band 72 being backed by a suitably shaped die. Although sharp protrusions or teeth 82 and 84 are illustrated as having four sides and four corners and four creases, it may have any other suitable shape. For example, it may have three, five or six sides and corners and creases. Moreover, the lines representing creases may, instead, comprise thin openings. Thus, the sharp protrusions or teeth may be closed with creases or instead of creases, small openings may exist. Alternatively, a pointed tool may partially penetrate curvilinear band 72 to form a small opening surrounded by a crater shaped like a tiny volcano or shaped like the punched grating elements observed on food graters. The peak of a crater shaped protrusion comprises a sharp edge or plurality of points arranged in a tiny circle capable of engaging the adjacent inner surface of the imaging cylinder of the adjacent outer surface of the supporting hub during mounting of the hub on the end of the imaging cylinder. Although protrusions or teeth 82 and 84 are illustrated in FIG. 9 as aligned in a single row parallel to the centerline of curvilinear band 72, the protrusions may be offset from the centerline, or formed in multiple parallel rows, or even staggered relative to the centerline of curvilinear band 72.

Figure 10:
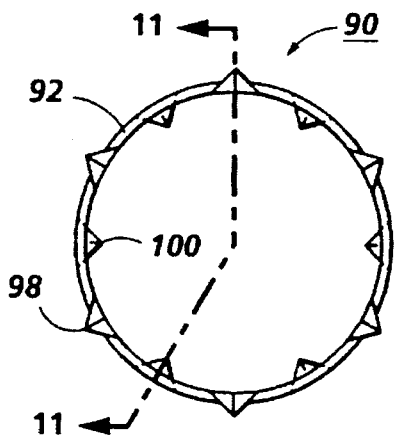
FIG. 10 is a schematic end view of swaged sharp protrusions of this invention extending toward and away from the axis of a barbed annular ring.
Figure 11:
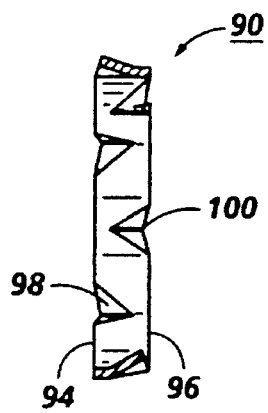
FIG. 11 is a schematic side view of sharp protrusions of this invention formed by swaging both edges of a barbed annular ring, the protrusions extending toward and away from the axis of the annular ring.
Figure 12:
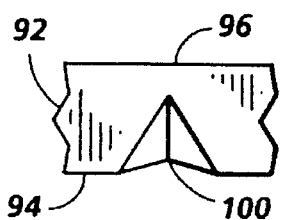
FIG. 12 is a schematic sectional plan view of a sharp swaged protrusion of this invention on only one edge of a barbed annular ring, the protrusion extending away from the axis of a barbed annular ring.
Figure 13:
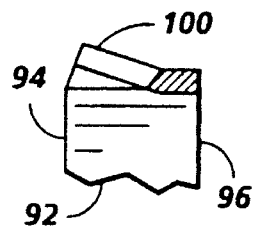
FIG. 13 is a schematic sectional side view of a sharp swaged protrusion of this invention shown in FIG. 12.

Referring to FIGS. 10 and 11, another barbed annular ring 90 embodiment is illustrated comprising a curvilinear band 92 having a generally rectangular cross section, a first edge 94, a second edge 96 and sharp protrusions or teeth 98 and 100. Sharp protrusions or teeth 98 and 100 may be formed by any suitable technique such as swaging similar to the technique utilized to form the offset teeth in a saw blade. Swaging may be accomplished, for example, by forming a metal workpiece, bending or otherwise deforming the workpiece by using a tool and die and hydraulic force to form the metal workpiece into a desired configuration. Expanded views of sharp protrusion 100 are shown in FIGS. 12 and 13.

Figure 14:
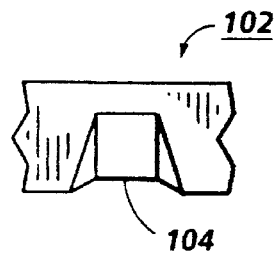
FIG. 14 is a schematic side view of is a schematic sectional plan view of an other embodiment of a sharp swaged protrusion of this invention.

Illustrated in FIG. 14 is still another embodiment of a barbed annular ring 102 in which the sharp protrusion or tooth 104 terminates into a chisel edge or point. This embodiment provides a greater bite per tooth to resist relative movement between the cylinder and the end flange.

Figure 15:
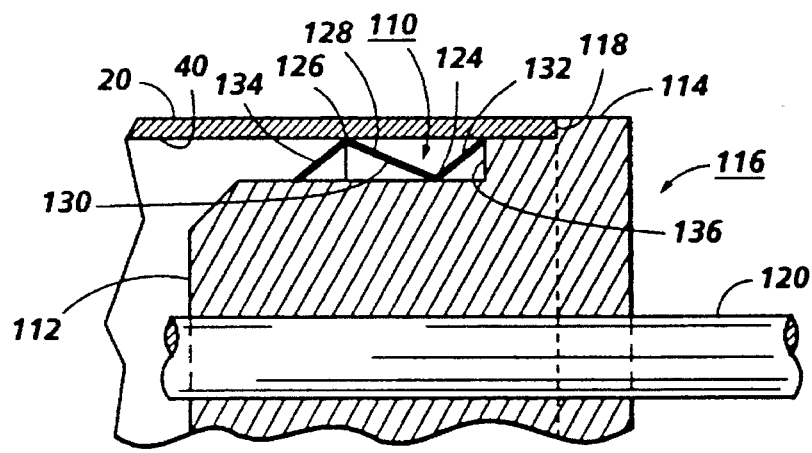
FIG. 15 is a schematic side view of another embodiment of an end flange, barbed annular ring and hollow cylinder assembly of this invention.
Figure 18:
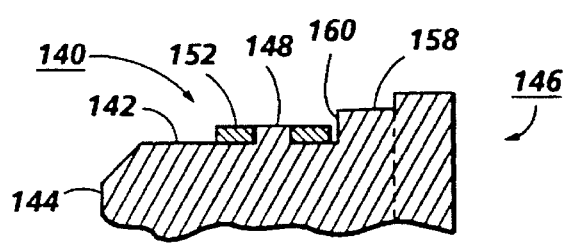
FIG. 18 is a schematic partial sectional side view of the end flange and barbed annular ring shown in FIG. 16.

Referring to FIG. 15, a resilient barbed annular ring 110 is illustrated supported on a support hub 112 carried by a disk shaped member 114 of end flange 116. Annular ring 110 has a configuration similar to ring 10 shown in FIG. 1 except that ring 110 is unitary, i.e. continuous, rather than split. End Flange 116 supports a cylindrical imaging member 20. Shoulder 118 of end flange 116 abuts one end of cylindrical imaging member 20 to ensure alignment of flange 116 to the end of cylindrical imaging member 20. A support shaft 120 extends along the axis of cylindrical imaging member 20 and through a hole in the center of flange 116. Barbed annular ring 110 comprises a central curvilinear band 122 having a substantially rectangular cross section, a first edge 124, a second edge 126, an outwardly facing surface 128 and an inwardly facing surface 130. A plurality of sharp protrusions or teeth 132 extend from first edge 124 of ring 110 in a direction away from hub 112 and toward the inner surface 40 of cylindrical imaging member 20. A plurality of sharp protrusions or teeth 134 extend from second edge 126 of ring 110 in a direction toward hub 116 and away the inner surface 40 of cylindrical imaging member 20. Shoulder 136 of end flange 116 abuts protrusions or teeth 132 to ensure alignment of ring 110 so that it is concentric with cylindrical imaging member 20 and hub 112. As seen in FIG. 18, with ring 110 resting on the outer surface of hub 112, the two points located the greatest distance from the outer surface of hub 112 are the tip of sharp protrusion or tooth 132 and the corner formed by the intersection of protrusion or tooth 134 and outwardly facing surface 128. The shortest distance between the outer surface of hub 112 and either of the two points falls along an imaginary line perpendicular to the outer surface of hub 112 and intersecting either of these two points. Prior to insertion of hub 112 into an end of cylindrical imaging member 20, the length of the two imaginary lines should be greater than the radial height of shoulder 116 to ensure that sharp protrusions 132 engage and, if desired, partially penetrate the inner surface 40 of cylindrical imaging member 20 and sharp protrusions or teeth 134 partially penetrate the outer surface of hub 112 during insertion of hub 112 into an end of cylindrical imaging member 20. Thus, annular ring 110 will be squeezed toward hub 112 and sharp protrusions 132 and sharp protrusions 134 will engage inner surface 40 of cylindrical imaging member 20 and outer surface of hub 112, respectively, when hub 112 carrying ring 110 is inserted into the interior of cylindrical imaging member 20. Annular ring 110 should not be so large in size that it blocks insertion of hub 112 into the end of cylindrical imaging member 20 or so small that sharp protrusions 132 and sharp protrusions 134 fail to engage inner surface 40 of cylindrical imaging member 20 and outer surface of hub 112, respectively, when hub 112 carrying ring 110 is inserted into the interior of cylindrical imaging member 20. Because of the presence of sharp protrusions or teeth 134 engaging the outer surface of hub 112, shoulder 136 suffices for retaining ring 110 in position on hub 112 and there is no need for a channel with walls on both sides of ring 110.

Figure 16:
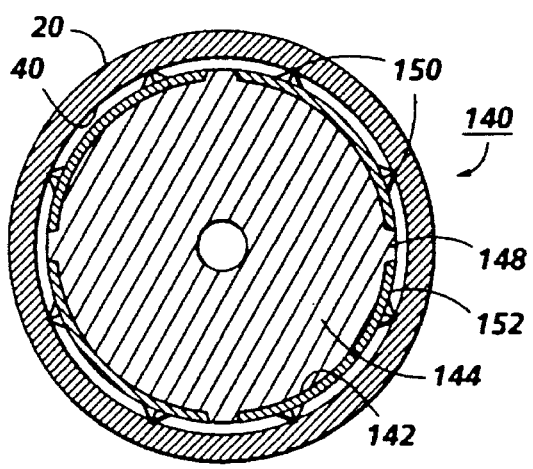
FIG. 16 is a schematic end view of an end flange, barbed annular ring and hollow cylinder assembly showing spaced studs to retain the annular rings of this invention on the hub of the end flange.
Figure 17:
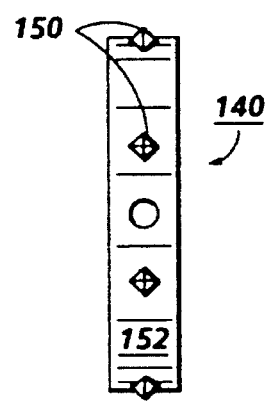
FIG. 17 is a schematic side view of the barbed annular ring embodiment utilized in the assembly shown in FIG. 16.

Shown in FIGS. 16, 17 and 18, is a barbed annular ring 140 supported on the outer surface 142 of an annular support hub 144 carried by an end flange 146. The outer surface 142 of annular support hub 144 carries studs or projections 148 having a cylindrical shape (see FIGS. 16 and 18). Barbed annular ring 140 comprises a plurality of sharp protrusions or teeth 150 extending from outwardly facing surface 152 toward the inner surface 40 of cylindrical imaging member 20 (See FIG. 16). Barbed annular ring 140 also comprises a plurality of round holes 154 adapted to receive projections 148 of annular support hub 144. Projections 148 ensure alignment of annular ring 140 relative to end flange 146 and the end of cylindrical imaging member 20. At least 2 projections 148 are employed with a ring, the projections being about 180 degrees apart around the periphery of hub 144. If 3 projections 148 are employed, they are preferably spaced about 120 degrees apart around the periphery of hub 144. Barbed annular ring 140 is split at the bottom of FIG. 16 and the ends of the split abut each side of a projection 148. The split allows temporary bending to enlarge the diameter of annular ring 140 to facilitate mounting of annular ring 140 onto projections 148 so that they may be guided into holes 154. If desired, the bottom projection 148 shown in FIG. 16 may be omitted. Shoulder 156 of end flange 146 abuts one end of cylindrical imaging member 20 to maintain alignment of end flange 146 with cylindrical imaging member 20 (See FIGS. 16 and 18). Rim 158 of end flange 146 maintains cylindrical imaging member 20 concentric with end flange 146. Shoulder 160 of end flange 146 maintains spacing between the inner surface 40 of cylindrical imaging member 20 and the outer surface of hub 144 for annular ring 140. Sharp protrusions 150 partially penetrate the inner surface 40 of cylindrical imaging member 20 because the dimensions of annular ring 140 prior to positioning between hub 62 and inner surface 40 of cylindrical imaging member 20 are preselected so that the tips of sharp protrusions or teeth 150 extend out above the radial height of shoulder 160. Thus, during insertion of end flange 146 into cylinder 20, compressive pressure is applied by inner surface 40 to at least the sharp protrusions or teeth 150 of annular ring 140 at least partially in a direction toward outer surface of hub 144 to ensure that sharp protrusions 150 engage and, if desired, partially penetrate inner surface 40 of cylindrical imaging member 20. In this embodiment there is no need for any sharp protrusions or teeth extending from ring 140 toward the outer surface of hub 144. Annular ring 140 should not be so large in size that it blocks insertion of hub 144 into the end of cylindrical imaging member 20 or so small that sharp protrusions 150 fail to engage surface 40 of cylindrical imaging member 20 when hub 144 carrying ring 140 is inserted into the interior of cylindrical imaging member 20. Although projections 148 are illustrated as having a cylindrical shape, any other suitable shape may be utilized. Typical shapes include, for example, oval, triangular, square, pentagonal, and the like. The holes 154 should preferably have a shape that will accommodate the cross sectional shape ultimately selected for the projections. Instead of projections 148, the annular ring may be held in position on hub 144 by the use of a channel similar to that illustrated in FIG. 1.

The annular rings of this invention may be fabricated by any suitable technique. Typical fabrication techniques include molding, electrical discharge machining, laser cutting, stamping, swagging and the like. As described above, fabrication may for example, be stamped from a flat sheet of metal, formed into a ring shape and tempered where desired. The sharp protrusions or teeth may be formed prior to, during or subsequent to the stamping, casting or machining operation. For example, the teeth may be formed at the time a sheet metal central curvilinear band is stamped with the teeth being simultaneously formed on one or both sides of the central curvilinear band. The annular rings of this invention should be bendable, but resist permanent deformation. Preferably, the annular rings comprise a metal having hard, spring-like properties. The annular ring may comprise a tempered metal. Hard tempered metal annular rings are particularly desirable when employed with end flanges and/or hollow cylindrical members that comprise hard materials. Typical hard, spring-like metals include, for example, steel, stainless steel, copper beryllium alloy, phosphorous bronze, and the like. Other typical metals include, for example, aluminum, and the like. The specific material and length, width, and thickness selected affect the resiliency of the annular rings. The width and thickness of the central curvilinear band portion of the ring should be sufficient to resist permanent deformation and to retain the end flange in position at at least one end of the hollow cylindrical member. Typical physical thicknesses are between about 0.1 millimeter and about 1 millimeter for a curvilinear band having a rectangular cross section. These dimensions are also applicable to the overall dimensions of the swaged annular rings illustrated in FIGS. 10 through 14. A typical stiffness of the curvilinear band ranges from between about 1 kgf/mm and about 1000 kgf/mm.

Generally, at least six sharp protrusions or teeth should be distributed around the periphery of the annular ring facing the inner surface of the hollow cylindrical member. These protrusions should at least face away from the supporting hub. Where protrusions facing toward the supporting hub are the only means used to maintain the annular ring in place on the hub of the end flange, the ring should also contain at least six sharp protrusions or teeth distributed around the periphery of the annular ring facing the hub. Uniform spacing of the sharp protrusions around the periphery of the ring is preferred to minimize deformation of the hollow cylindrical member. Generally, the protrusions should at least be visible to the naked eye and should also be large enough to be felt by sliding a fingernail along the surface of the ring. Further, the protrusions should be short enough to allow removal of the end flange from the end of the hollow cylindrical member without destroying the hollow cylindrical member or the end flange. Typically, the protrusions are large enough to penetrate the inner surface of the hollow cylindrical member to a depth of between about 10 micrometers and about 300 micrometers. The expression "sharp" as employed herein is defined as having a keen edge or point sufficient to penetrate or at least provide sufficient frictional engagement with the materials utilized in the hollow cylindrical member and hub to prevent slipping, if protrusions for penetration of the hub are employed. The angle selected for the protrusions relative to the hub surface depends upon the type of annular ring embodiment selected, the amount of torque applied during use, the hardness of the assembly components, the configuration and sharpness of the protrusion points or edges, the number of protrusions and the like. However, the protrusion should generally extend in the direction of the surface to be engaged and the angle or incline selected should be sufficient to prevent slippage between the hollow cylinder, annular ring and end flange under operating conditions. Typical protrusion point or edge inclines are between about 1 degree and about 90 degrees. However, it is possible to have an incline that is greater than 90 degrees. For example, tooth 36 in FIG. 1 may bent so severely that it leans toward the opposite end of the cylinder.

The annular rings of this invention may be unitary and comprise a complete 360 degree ring or may comprise a split ring which forms an arc between about 200 degrees and about 360 degrees. Generally, a partial or split ring extending through an arc between about 270 degrees and about 360 degrees is preferred because a sufficiently larger arc is available for securing the hub to the hollow cylindrical member, the sharp protrusions or teeth can be made smaller, and the sharp protrusions or teeth can be more uniformly distributed to lessen the likelihood of distorting the hollow cylindrical member.

Resistance of the end flange against slippage relative to the hollow cylindrical member when either the end flange or hollow cylindrical member is rotated around their common axis by an externally applied torque depends upon numerous factors such as the amount of torque applied to the end flange, hollow cylindrical member or both, the size and number of sharp protrusions or teeth, the hardness of the supporting hub and the interior surface material of the hollow cylindrical member, and the like. Satisfactory results for electrostatographic imaging conditions are achieved when the size and number of sharp protrusions or teeth employed on the annular rings of this invention locks the end flange to the hollow cylindrical member to prevent slippage when a torque between about 10 inch-pounds (0.115 kilogram-meters) and about 40 inch pounds (0.46 kilogram-meters) are applied. Preferably, the combination of end flange and hollow cylindrical member of this invention should resist slippage under an applied torque of between about 15 inch-pounds (0.17 kilogram-meters) and about 30 inch-pounds (0.4 kilogram-meters). The protrusions should be large enough to engage and, in some embodiments, even penetrate the inner surface of the hollow cylindrical member, by not so large as to deform the circular cross sectional shape of the hollow cylindrical member. Deformation of the overall shape of the end flange hub and the drum should be invisible to the naked eye.

If desired, a plurality of adjacent annular rings sharing a common axis may be utilized with the end flange. However, the use of a plurality of springs tends to increase the cost and complexity of the end flange assembly.

Any suitable end flange may be utilized with the annular rings of this invention. The flange may comprise any suitable metal, plastic or combination of a metal and a plastic materials. Although more expensive, typical metals include, for example, steel, aluminum, copper, bronze, brass stainless steel, and the like. Typical plastic materials include thermosetting or thermoplastic resins which are dimensionally stable. These plastic members may be filled or untilled. Any suitable conventional filling material may be utilized. Typical thermoplastic resins include, for example, acrylonitrile butadiene styrenes (ABS), polycarbonates, nylons, acrylics Delrin, polyesters and the like. Typical thermosetting resins include, for example, alkyds, allylics, epoxies, phenolics, and the like. Plastic end flanges are preferred because they are easily molded and are less expensive. If desired, plastic end flanges may comprise electrically conductive components such as conductive filler particles of metal, carbon black or the like to impart electrical conductivity properties to the end flange.

Generally, the outer periphery of the supporting hub of the end flange which supports and is in contact with the annular ring has a circular cross section. This surface is preferably continuous to ensure uniform support of the annular ring particularly where the annular ring contains protrusions extending toward the surface of the supporting hub for engagement with the supporting hub. If desired, the supporting hub may have an annular groove for retaining the ring. Generally, where an annular groove is utilized, a partial ring is preferred for mounting into the annular groove because it can be sprung outwardly to increase its diameter during mounting. However, if desired, an annular groove may comprise components which can be disassembled for mounting of a unitary annular ring. For example, one wall of the hub can comprise a removable nut or a removable head of a screw. To ensure that the annular ring is retained in a predetermined location on the hub during mounting of the hub and ring combination into one end of a hollow cylinder, the surface of the hub may be fitted with a step, projections, pins or the like which contact the ring. The end flange may optionally comprise a conventional gear to facilitate driving of the end flange and hollow cylindrical member assembly. If desired, an end flange of this invention may be utilized at both ends of a hollow cylinder rather than only at one end.

In an alternative embodiment illustrated in FIGS. 16 through 18, the hubs of this invention may comprise projections extending away from the supporting hub and toward the inner surface of the hollow cylindrical member, the projections fitting into corresponding openings in the annular ring. These projections may molded into the hub, screwed into the hub or formed in the outer periphery of supporting hub by any other suitable technique.

When the end flange material is electrically insulating, a conventional grounding strap may be utilized to ground the electrostatographic imaging member substrate to the supporting shaft, if desired. A grounding strap may comprise a flexible metal strip supported by the end flange with one end of the strip contacting the supporting shaft and the other end contacting the substrate of the electrostatographic imaging member. An example of this type of strap is described in U.S. Pat. No. 4,561,763, the entire disclosure thereof being incorporated herein by reference.

The end flange, annular ring and hollow cylindrical member assembly of this invention locks together and prevents slippage under application of torque. This locking can be be accomplished with an assembly free of any adhesive between the end flange and the hollow cylindrical member.

If desired, torque may be applied to the end flange by any suitable gear driven means (not shown) through gear teeth that are an integral part of the end flange or by a gear attached to the end flange. The gear driven means may be connected to a suitable power source as is conventional in the art. Such an arrangement is well known in the art and is illustrated, for example, in U.S. Pat. No. 3,900,258 to R. F. Hoppner et al, the entire disclosure thereof being incorporated herein by reference. However, a gear may be formed separately and merely attached to the flange by any suitable means such as bolts, rivets, adhesives and the like (not shown). Alternatively, torque may be applied to an end flange through a pulley (not shown) attached to the flange, the pulley being driven by a belt (not shown). In still an other embodiment, the end flange may be secured to a drive shaft (not shown) which is driven by any suitable conventional means such as a direct drive electric motor (not shown). Generally, when utilized to support and drive a hollow electrostatographic imaging member, the annular ring and end flange combination of this invention should withstand an applied torque of at least about 30 inch pounds (0.40 kilogram-meters) without encountering slippage between the end flange hub, the annular ring and the inner surface of the hollow cylindrical imaging member. Where the hollow cylindrical member is driven by torque applied to an annular ring and end flange combination located at one end of the cylindrical member and an end flange at the opposite end of the drum is employed to drive numerous other components of an imaging system, the annular ring and end flange combination will be subjected to considerable torque. Also, resistance to cylinder rotation due to peripheral devices such as cleaning blades, brushes or webs in contact with the outer imaging surface of a cylindrical member may need to be considered when determining the amount of torque that must be overcome without slippage between the end flange and the cylinder.

Electrostatographic imaging drums that may be used in the assemblies of this invention comprise a hollow cylindrical electrically conductive substrate and at least one electrostatographic layer. Electrostatographic layers are well known in the art and may comprise a dielectric layer for electrographic imaging or at least one electrophotographic imaging layer for electrophotographic imaging.

Since the assembly of hollow cylindrical member, end flange and annular ring can be free of any adhesive, assembly and disassembly are rapid and simple. This greatly facilitates recycling of the components after disassembly. The end flange of this invention will withstand slippage, relative to the hollow cylindrical member, when torque is applied and yet can be readily be removed by application of a pulling force. Avoidance of slippage assures registration of electrostatographic images and enhances achievement of quality electrostatographic images.

The invention has been described in detail with particular reference to preferred embodiments thereof but it will be understood that variations and modifications can be effected within the spirit and scope of the invention as described herein above and as defined in the appended claims.

What is claimed is:

1. A hollow cylinder supporting end flange comprising a disk shaped member, a supporting hub extending axially from said disk shaped member and an annular ring supported on said hub, said ring having an imaginary axis, and a plurality of sharp protrusions extending from said ring in a direction away from said axis for engagement with said hollow cylindrical member upon insertion of said annular ring into said hollow cylindrical member.

2. A hollow cylinder supporting end flange according to claim 1 wherein said ring comprises a central curvilinear band having a rectangular cross section having a first edge, a second edge, an outer surface and an inner surface.

3. A hollow cylinder supporting end flange according to claim 2 wherein said sharp protrusion extending from said ring in a direction away from said axis are pointed teeth located along said first edge of said band.

4. A hollow cylinder supporting end flange according to claim 2 wherein said ring also comprises a plurality of sharp protrusions located along said second edge of said band, said protrusions located along said second edge extending from said band in a direction toward said axis.

5. A hollow cylinder supporting end flange according to claim 2 wherein said sharp protrusions extending from said ring in a direction away from said axis are located on said outer surface.

6. A hollow cylinder supporting end flange according to claim 5 wherein said ring has an imaginary centerline and said sharp protrusions located along said outer surface are in at least a single row substantially parallel to said centerline of said band.

7. A hollow cylinder supporting end flange according to claim 5 wherein said ring has an imaginary centerline and said sharp protrusion located on said outer surface are staggered relative to said centerline of said band.

8. A hollow cylinder supporting end flange according to claim 2 wherein said ring also comprises a plurality of sharp protrusions located along said second edge of said band, said protrusions located along said second edge extending from said band in a direction toward said axis.

9. A hollow cylinder supporting end flange according to claim 2 wherein said sharp protrusion extending from said ring in a direction away from said centerline are located on said outer surface.

10. A hollow cylinder supporting end flange according to claim 1 wherein said ring also comprises a plurality of sharp protrusions extending from said ring in a direction toward said centerline.

11. A hollow cylinder supporting end flange according to claim 4 wherein said sharp protrusion extending from said ring in a direction toward said centerline are pointed teeth located along one edge of said ring.

12. A hollow cylinder supporting end flange according to claim 1 wherein said ring is a split ring forming an arc between about 200 degrees and about 360 degrees.

13. A hollow cylinder supporting end flange according to claim 1 wherein said hub comprises a plurality of studs extending away from said axis and said ring comprises a plurality of holes aligned with said studs whereby said studs extend into said holes to retain said ring on said hub.

14. A hollow cylinder supporting end flange according to claim 1 wherein said protrusions terminate into a single peak.

15. A hollow cylinder supporting end flange according to claim 1 wherein said protrusions resemble a pyramid shaped point.

16. A hollow cylinder supporting end flange according to claim 1 wherein said protrusions comprise swaged peaks.

17. A hollow cylinder supporting end flange according to claim 1 wherein said protrusions are substantially uniformly distributed around the periphery of said ring.

18. A hollow cylinder supporting end flange according to claim 1 wherein said protrusions are located in clusters of protrusions, said clusters being substantially uniformly distributed around the periphery of said ring.

19. A hollow cylinder supporting end flange according to claim 1 wherein said hub comprises an annular groove in which said ring is retained.

20. An assembly comprising a hollow cylindrical member having a circular cross section and an inner surface and an end flange comprising a disk shaped member having a circular periphery, a supporting hub extending axially from said disk shaped member into one end of said hollow cylindrical member and an annular ring supported on and secured to said hub, said ring having an imaginary axis, and a plurality of sharp protrusions extending from said ring in a direction away from said axis for engagement with said inner surface of said hollow cylindrical member to secure said hollow cylindrical member to said end flange.

21. An assembly according to claim 20 wherein said engagement includes partial penetration of said sharp protrusions into said inner surface of said hollow cylindrical member.

* * * * *